(12) United States Patent
Katakura

(10) Patent No.: US 7,576,924 B2
(45) Date of Patent: Aug. 18, 2009

(54) TWO-UNIT ZOOM LENS SYSTEM AND IMAGE PICKUP APPARATUS USING THE SAME

(75) Inventor: Masahiro Katakura, Hino (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/220,271

(22) Filed: Jul. 22, 2008

(65) Prior Publication Data

US 2009/0034093 A1   Feb. 5, 2009

(30) Foreign Application Priority Data

Aug. 1, 2007   (JP) ............... 2007-200600

(51) Int. Cl.
*G02B 15/14* (2006.01)
(52) U.S. Cl. .................. 359/691; 359/680
(58) Field of Classification Search ......... 359/691, 359/676, 680, 683
See application file for complete search history.

(56) References Cited

U.S. PATENT DOCUMENTS

2006/0092525 A1 * 5/2006 Sato et al. ............ 359/682
2006/0221212 A1   10/2006 Hankawa et al.
2006/0284052 A1   12/2006 Toshikiyo et al.
2007/0223102 A1 *  9/2007 Betensky ............. 359/680

FOREIGN PATENT DOCUMENTS

JP    2006-284790    10/2006
JP    2006-351972    12/2006

* cited by examiner

*Primary Examiner*—Darryl J Collins
(74) *Attorney, Agent, or Firm*—Kenyon & Kenyon LLP

(57) ABSTRACT

A two-unit zoom lens system includes in order from an object side thereof, a first lens unit G1 having a negative refracting power, a second lens unit G2 having a positive refracting power, and an aperture stop which is disposed between the first lens unit G1 and the second lens unit G2, and which moves integrally with the second lens unit. At a time of zooming from a wide angle end to a telephoto end, a distance between the first lens unit G1 and the second lens unit G2 is narrowed. At the time of zooming from the wide angle end to the telephoto end, the first lens unit G1, after moving toward an image side, moves toward an object side. At the time of zooming from the wide angle end to the telephoto end, the second lens unit G2 moves toward the object side. The second lens unit G2 includes in order from the object side thereof, a front sub-unit having a positive refracting power, and a rear sub-unit having a negative refracting power. The two-unit zoom lens system satisfies predetermined conditional expressions.

10 Claims, 11 Drawing Sheets

TWO-UNIT ZOOM LENS SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2007-200600 filed on Aug. 1, 2007; the entire contents of which are incorporated herein by reference.

BACKGROUND OF THE INVENTION

1. Field of the Invention

The present invention relates to a small size zoom lens system, and an image pickup apparatus such as a compact digital camera in which the zoom lens system is used.

2. Description of the Related Art

In an image pickup apparatus such as a digital camera and a video camera, a high image quality, a high magnification, and a thinning of a lens frame have been sought. For example, a two-unit zoom lens system which includes a first lens unit having a negative refracting power and a second lens unit having a positive refracting power as described in Japanese Patent Application Laid-open Publication No. 2006-284790 has hitherto been known. This two-unit zoom lens system is advantageous for simplification of a drive mechanism, as the number of lens units to be moved at the time of zooming is two, which is small.

However, a need of making small an overall length of the zoom lens system with respect to an image plane size is becoming increasingly high. On the other hand, recently, an image pickup element which is capable of picking up a favorable image even when an angle of incidence of light rays incident on a surrounding portion in an image pickup area of an image pickup element, as disclosed in Japanese Patent Application Laid-open Publication No. 2006-351972 has been known.

SUMMARY OF THE INVENTION

According to a first aspect of the present invention, there is provided a two-unit zoom lens system including in order from an object side thereof a first lens unit having a negative refracting power, a second lens unit having a positive refracting power, and an aperture stop which is disposed between the first lens unit and the second lens unit, and which moves integrally with the second lens unit, and at the time of zooming from a wide angle end to a telephoto end, a distance between the first lens unit and the second lens unit is narrowed, and at the time of zooming from the wide angle end to the telephoto end, the first lens unit, after moving toward an image side, moves toward an object side, and at the time of zooming from the wide angle end to the telephoto end, the second lens unit moves toward the object side, and the second lens unit includes in order from the object side thereof, a front sub-unit having a positive refracting power and a rear sub-unit having a negative refracting power, with the longest air space in the second lens unit between the front sub-unit and the rear sub-unit, and there is no other lens unit in the second lens unit, and the two-unit zoom lens system satisfies the following conditional expressions $$f_t/f_w > 3.6 \quad (1)$$

$$0.5 < d_{2FR}/f_w < 1.5 \quad (2)$$

where, $f_w$ denotes a focal length at the wide angle end, of the two-unit zoom lens system, $f_t$ denotes a focal length at the telephoto end, of the two-unit zoom lens system, and $d_{2FR}$ denotes air space (an air space on an optical axis between the front sub-unit and the rear sub-unit in the second lens unit.

Moreover, according to a second aspect of the present invention, there is provided an image pickup apparatus including a two-unit zoom lens system, and an image pickup element which is disposed at an image side of the two-unit zoom lens system, and which converts an optical image formed by the two-unit zoom lens system, to an electric signal, and the two-unit zoom lens system is a zoom lens system according to the first aspect described above, of the present invention.

BRIEF DESCRIPTION OF THE DRAWINGS

FIG. 1A shows a state at a wide angle end, FIG. 1B shows an intermediate state, and FIG. 1C shows a state at a telephoto end;

DETAILED DESCRIPTION OF THE PREFERRED EMBODIMENTS

Figure 1A:
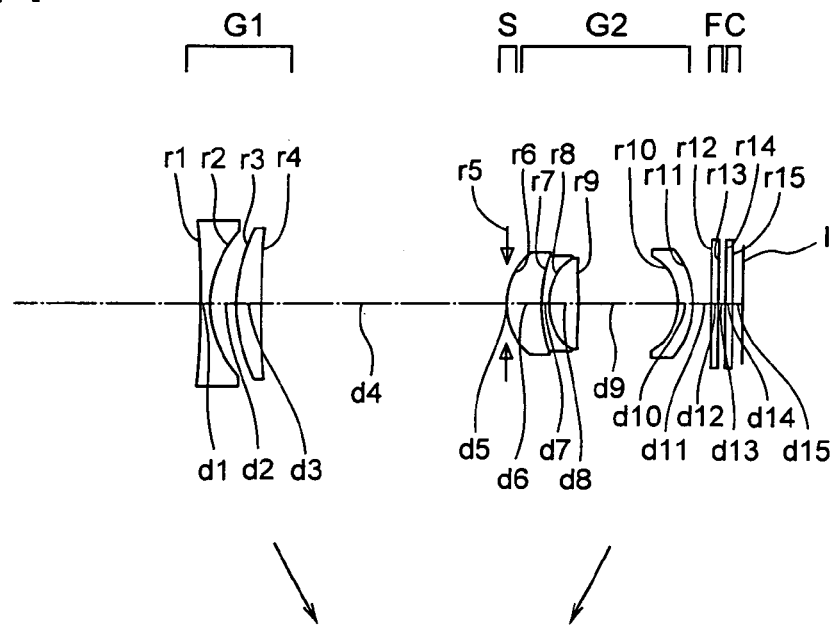
FIG. 1A, FIG. 1B, and FIG. 1C are lens cross-sectional views at the time of infinite object point focusing of a first embodiment of a zoom lens system according to the present invention, where.

A two-unit zoom lens system according to a second aspect of the present invention has a structure including a first lens unit having a negative refracting power, a second lens unit having a positive refracting power, and an aperture stop which is disposed between the first lens unit and the second lens unit, and which moves integrally with the second lens unit, and at a time of zooming from a wide angle end to a telephoto end, a distance between the first lens unit and the second lens unit is narrowed, and at the time of zooming from the wide angle end to the telephoto end, the first lens unit, after moving toward an image side, moves toward an object side, and at the time of zooming from the wide angle end to the telephoto end, the second lens unit moves toward the object side, and the second lens unit includes in order from the object side thereof, a front sub-unit having a positive refracting power and a rear sub-unit having a negative refracting power, with a longest air space in the second lens unit between the front sub-unit and the rear sub-unit.

In this manner, by letting the refracting power of the first lens unit to be negative, it is advantageous for securing an image, reducing size in a radial direction, and reducing the number of lens units forming the zoom lens system. The reduction in the number of lens units is advantageous also for reducing the number of lenses. As a result, it leads to thinning of a lens frame and to a reduction in cost.

Moreover, by the second lens unit having the positive refracting power changing the distance with the first lens unit, the second lens unit functions as a variator, and a magnification is increased by moving from the object side to the image side at the time of zooming from the wide angle end to the telephoto end. The first lens unit, by the abovementioned movement, functions as a compensator while suppressing the overall length.

By disposing the rear sub-unit having the negative refracting power away from the front sub-unit in the second lens unit, symmetry of a power distribution of the overall zoom lens system becomes favorable. Accordingly, it is balanced with the negative refracting power of the first lens unit, and an aberration such as an image plane curvature and a distortion more than necessary does not occur. As a result, it is possible to provide a zoom lens system in which, a longitudinal aberration and an oblique aberration are balanced.

Moreover, it is easy to secure a function of refracting an off-axis chief ray in a direction away from the optical axis in the rear sub-unit, and it is advantageous for making small the zoom lens system with respect to a size of an image plane.

A lens arrangement in the second lens unit becomes an arrangement of a telephoto type, and it is advantageous for securing a magnification ratio while achieving a size reduction, by bringing a principal point closer to the first lens unit.

Furthermore, the two-unit zoom lens system according to the present invention has an aperture between the first lens unit and the second lens unit, which moves integrally with the second lens unit.

By making such an arrangement, it is possible to suppress a height of off-axis light rays incident on the first lens unit, and to reduce further a size in a radial direction. Moreover, it is possible to reduce also a size of the front sub-unit in the second lens unit, and it is advantageous for reducing the size, and securing the positive refracting power of the rear sub-unit in the second lens unit. Moreover, it is possible to prevent an exit pupil from coming too close to an image pickup element. Furthermore, it is possible simplify a drive mechanism by the movement of the aperture stop integrally with the second lens unit, and it is advantageous also for simplifying the structure.

With such basic structure of the two-unit zoom lens system, an arrangement is made such that the two-unit zoom lens system satisfies the following conditional expressions.

$$f_t/f_w > 3.6 \quad (1)$$

$$0.5 < d_{2FR}/f_w < 1.5 \quad (2)$$

where, $f_w$ denotes a focal length at the wide angle end, of the two-unit zoom lens system, $f_t$ denotes a focal length at the telephoto end, of the two-unit zoom lens system, and $d_{2FR}$ denotes an air space air space on an optical axis between the front sub-unit and the rear sub-unit in the second lens unit.

Conditional expression (1) is an expression which specifies a zooming ratio. It is preferable to secure the zooming ratio by making an arrangement such that a value is not lower than a lower limit value in conditional expression (1)

Conditional expression (2) is an expression which specifies an air space on the optical axis between the front sub-unit and the rear sub-unit in the second lens unit.

By satisfying conditional expression (2), it is possible to increase appropriately a height of incidence of a chief ray on the rear sub-unit having the negative refracting power, particularly at the wide angle end. Therefore, it is possible to correct favorably various oblique aberrations which occur at the first lens unit by the rear sub-unit having the negative refracting power in the second lens unit.

By making an arrangement such that a value is not lower than a lower limit value in conditional expression (2), the height of light rays of off-axis chief ray incident on the rear sub-unit is secured, and it is advantageous for securing favorably various oblique aberrations. Moreover, it becomes easy to secure the function of refracting the off-axis light rays to be away from the optical axis, and it is advantageous for making small the zoom lens system.

On the other hand, by making an arrangement such that a value is not higher than an upper limit value in conditional expression (2), it becomes easy to suppress a size in an optical axial direction of the second lens unit, from becoming large.

Furthermore, it is preferable to have at least one of the following arrangements.

It is preferable to carry out a focusing by an object at a long distance to an object at a short distance by moving the rear sub-unit in the second unit to the image side.

Accordingly, at the time of focusing from the long distance object to the short distance object, the rear sub-unit moves toward the image side. Therefore, it becomes possible to hold a sufficient focusing distance without disturbing a balance of aberration, particularly at the telephoto end.

Moreover, it is preferable that the two-unit zoom lens system according to the present invention satisfies the following conditional expressions $$3 < D_w/f_w < 8 \quad (3)$$

$$0.3 < D_t/f_t < 1.8 \quad (4)$$

where, $D_w$ denotes an overall optical axial length at the wide angle end, of the two-unit zoom lens system, $D_t$ denotes an overall optical axial length at the telephoto end, of the two-unit zoom lens system, and the overall length is a length which is obtained by adding a back focus expressed in terms of an air conversion length, to an optical axial thickness from a surface of incidence of a lens nearest to the object up to a surface of emergence of a lens nearest to the image, of the two-unit zoom lens system.

Conditional expressions (3) and (4) are expressions which specify a preferable overall length of the two-unit zoom lens system.

By making an arrangement such that a value is not higher than an upper limit value in conditional expressions (3) and (4), it is advantageous for thinning at the time of use. Moreover, by making an arrangement such that a value is not lower than a lower limit value in conditional expressions (3) and (4), it becomes easy to suppress the refracting power of each lens unit, and to reduce a longitudinal aberration and the oblique aberration.

Moreover, it is preferable that the first lens unit has a negative lens nearest to the object, which satisfies the following conditional expression.

$$0.0<(r_{L11}+r_{L12})/(r_{L11}-r_{L12})<3.0 \quad (5)$$

where, $r_{L11}$ denotes a paraxial radius of curvature of a surface on the object side, of the negative lens nearest to the object, in the first lens unit, and $r_{L12}$ denotes a paraxial radius of curvature of a surface on the image side, of the negative lens nearest to the object, in the first lens unit.

Conditional expression (5) is an expression related to a shape of a lens nearest to the object, in the first lens unit of the two-unit zoom lens system. By making an arrangement such that a value is not lower than a lower limit value in conditional expression (5), it becomes easy to suppress a curvature of a lens surface nearest to the object, in the first lens unit, and to suppress the oblique aberration.

Moreover, by making an arrangement such that a value is not higher than an upper limit value in conditional expression (5), it is possible to prevent the negative lens from being (projected) excessively close to the object with respect to a principal point of the negative lens, and it is advantageous for making the size small.

Moreover, in the two-unit zoom lens system of the present invention, it is preferable that front sub-unit in the second lens unit includes a cemented lens component having a positive lens and a negative lens, and that an Abbe's number of the negative lens in the cemented lens component is smaller than an Abbe's number of the positive lens in the cemented lens component.

For correcting a longitudinal chromatic aberration which is susceptible to occur particularly at the telephoto end, it is preferable to impart to the front sub-unit in the second lens unit having a positive refracting power, an achromatic function in the arrangement described above.

Moreover, in the two-unit zoom lens system according to the present invention, it is preferable that the total number of lenses in the rear sub-unit is one.

By structuring the rear sub-unit by one lens, it becomes is to reduce a weight and a cost. Further, it is possible to reduce a thickness when the lens barrel is) collapsed, by making collapse upon reducing a distance from the front sub-unit.

Moreover, in the two-unit zoom lens system according to the present invention, it is preferable that both surfaces namely, a lens surface nearest to the object and a lens surface nearest to the image in the front sub-unit are aspheric surfaces, from a point of suppressing a spherical aberration in all states from the wide angle end to the telephoto end.

Moreover, it is possible to use any of the two-unit zoom lens system described above as an image forming lens of an image pickup apparatus.

In other words, it is preferable to let the image pickup apparatus to be an apparatus including a two-unit zoom lens system, and an image pickup element which is disposed at an image side of the two-unit zoom lens system, and which converts an optical image formed by the two-unit zoom lens system, to an electric single, and the two-unit zoom lens system is one of the zoom lens systems described above. Accordingly, it is advantageous for making the apparatus small.

Furthermore, it is preferable that the image pickup apparatus according to the present invention includes an image conversion section which converts the electric signal including a distortion due to the two-unit zoom lens system, to an image signal in which, the distortion is corrected by an image processing.

Accordingly, by allowing the distortion of the two-unit zoom lens system, it is advantageous for reducing the number of lenses, and making small the size of the two-unit zoom lens system.

Moreover, in the image pickup apparatus according to the present invention, it is preferable that in a state at the wide angle end of the two-unit zoom lens system, an angle formed between an optical axis and a chief ray which is emerged from the two-unit zoom lens system directed toward the maximum image height of an effective image pickup area of the image pickup element satisfies the following conditional expression.

$$-40°<EX(w)<-11° \quad (8)$$

where,

EX(w) denotes the angle formed between the optical axis and the chief ray which is emerged from the two-unit zoom lens system directed toward the maximum image height of the effective image pickup area of the image pickup element.

By using the image pickup element which allows a size of an angle of emergence which satisfies conditional expression (6), a strong negative refracting power is imparted to the rear sub-unit, and it becomes easy to achieve a function of size reduction.

By making an arrangement such that a value is not higher than an upper limit value in conditional expression (6), it becomes easy to impart sufficient negative refracting power to the rear sub-unit, and it is advantageous for making small the two-unit zoom lens system, and improving the optical performance.

Moreover, by making an arrangement such that a value is not lower than a lower limit value in conditional expression (6), the angle of emergence is suppressed from becoming excessively large, and it is advantageous for securing oblique incident light.

Each of the abovementioned conditional expressions is let to be arranged in a state of being focused at the longest possible distance, when the two-unit zoom lens system has a focusing function.

It is preferable to let a lower limit value in conditional expression (1) to be 3.7, and a lower limit value of 3.8 is more preferable.

It is preferable to provide an upper limit value, and make an arrangement such that a value is not higher than 8.0, and more preferable to make an arrangement such that the value is not higher than 5.5.

Accordingly, it is advantageous for a size reduction and maintaining an optical performance.

It is preferable to provide a lower limit value in conditional expression (2), and make an arrangement such that the value is not lower than 0.7, and it is more preferable that the value is not lower than 0.9.

Accordingly, it becomes easy to maintain the strength of the lens.

It is preferable to let an upper limit value in conditional expression (2) to be 1.3, and an upper limit value of 1.2 is more preferable.

It is preferable to let a lower limit value in conditional expression (3) to be 4, and a lower limit value of 5 is more preferable.

It is preferable to let an upper limit value in conditional expression (3) to be 7, and an upper limit value of 6.5 is more preferable.

It is preferable to let a lower limit value in conditional expression (4) to be 0.6, and a lower limit value of 1.0 is more preferable.

It is preferable to let an upper limit value in conditional expression (4) to be 1.7, and an upper limit value of 1.6 is more preferable.

It is preferable to let a lower limit value in conditional expression (5) to be 0.3, and a lower limit value of 0.5 is more preferable.

It is preferable to let an upper limit value in conditional expression (5) to be 1.5, and an upper limit value of 1.0 is more preferable.

It is preferable to let a lower limit value in conditional expression (6) to be −30.0°, and a lower limit value of −25.0° is more preferable.

It is preferable to let an upper limit value in conditional expression (6) to be −14.0°, and an upper limit value of −16.0° is more preferable.

It is preferable that each aspect of the invention described above satisfies arbitrarily a plurality of conditional expressions simultaneously. Moreover, regarding each conditional expression, only an upper limit value and a lower limit value in a range of numerical values of the more restricted conditional expression may be restricted. Moreover, various structures described above may be combined arbitrarily.

Exemplary embodiments of the two-unit zoom lens system and the image pickup apparatus according to the present invention will be described below in detail by referring to the accompanying diagrams. However, the present invention is not restricted to the embodiments described below.

Each of the embodiments described below is a two-unit zoom lens system of a negative and positive refracting power type, having a favorable optical performance in which, a high zooming ratio of about 4 is achieved, and a half image angle at a wide angle end of 38° and more is secured. Moreover, it is a zoom lens system in which, near the wide angle end, at the rear sub-unit having a negative refracting power, off-axis light beam is made to be refracted in a direction separating away from an optical axis, and a size in a radial direction and an optical axial direction is small.

In the embodiments from a first embodiment to a third embodiment, an effective image pickup area in a full-zoom state is rectangular and constant.

Corresponding values in each embodiment are values in a state of being focused at an infinite object point.

The overall length is a length which is obtained by adding a back focus expressed in terms of an air conversion length, to an optical axial thickness from a surface of incidence of a lens up to a surface of emergence of the lens. The back focus indicates an air conversion length.

The embodiments from the first embodiment to the third embodiment of the zoom lens system according to the present invention will be described below. Lens cross-sectional views at the wide angle end (FIG. 1A), at the intermediate focal length state (FIG. 1B), and at the telephoto end (FIG. 1C) at the time of infinite object point focusing of the embodiments from the first embodiment to the third embodiment are shown in FIG. 1A to FIG. 3C. In FIG. 1A to FIG. 3C, G1 denotes a first lens unit, S denotes an aperture stop, G2 denotes a second lens unit, F denotes a parallel flat plate which forms a low pass filter in which, a wavelength region restricting coating which restricts infrared light is applied, C denotes a parallel flat plate of carbon glass of an electronic image pickup element, and I denotes an image surface (image plane). A multilayered film for restricting a wavelength region may be applied to a surface of the carbon glass C. Moreover, the carbon glass may be let to have an effect of a low pass filter.

Moreover, in each embodiment, the aperture stop S moves integrally with the second lens unit G2. Each numerical data is data in a state of being focused (when focused) at an object at an infinite distance. A unit of length for each numerical value is mm, and a unit of angle is degree (°). Further, zoom data is values at the wide angle end (WE), the intermediate focal length state (ST), and the telephoto end (TE).

Figure 1B:
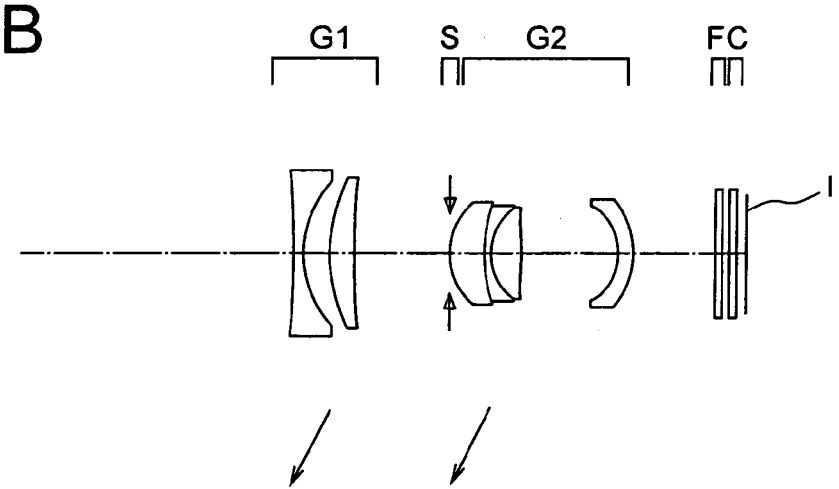
Figure 1C:
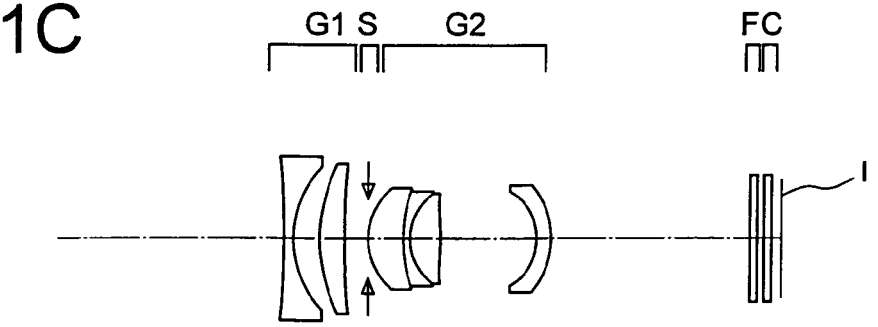

A zoom lens system in the first embodiment, as shown in FIG. 1A, FIG. 1B, and FIG. 1C, includes in order from an object side thereof, a first lens unit G1 having a negative refracting power, an aperture stop S, and a second lens unit G2 having a positive refracting power.

At the time of zooming from the wide angle end to the telephoto end, the first lens unit G1, after moving toward the image side, moves toward the object side. The second lens unit G2 moves only toward the object side. The focusing is carried out by a movement of the rear sub-unit, and an operation of focusing from a long distance object point to a short distance object point is carried out by moving the rear sub-unit to the image side.

In order from the object side, the first lens unit G1 includes a biconcave negative lens and a positive meniscus lens having a convex surface directed toward the object side. The second lens unit includes a cemented lens (front sub-unit having a positive refracting power) of a positive meniscus lens having a convex surface directed toward the object side, a negative meniscus lens having a convex surface directed toward the object side, and a biconvex positive lens, and a negative meniscus lens (rear sub-unit having a negative refracting power) having a convex surface directed toward the image side.

An aspheric surface is used for five surfaces namely, both surfaces of the biconcave negative lens in the first lens unit G1, a surface on the object side of the positive meniscus lens having the convex surface directed toward the object side, a surface on the image side of the biconvex positive lens, and a surface on the object side of the negative meniscus lens having the convex surface directed toward the image side in the second lens unit G2.

Figure 2A:
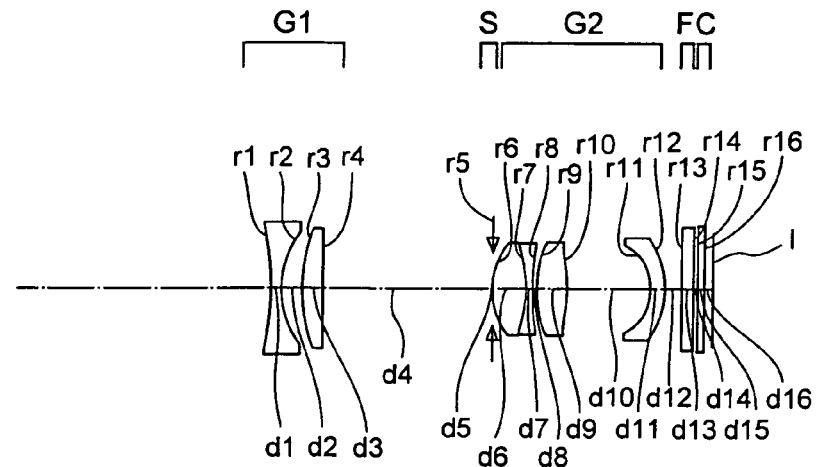
FIG. 2A, FIG. 2B, and FIG. 2C are diagrams similar to FIG. 1A, FIG. 1B, and FIG. 1C respectively, of a second embodiment of the zoom lens system according to the present invention.
Figure 2B:
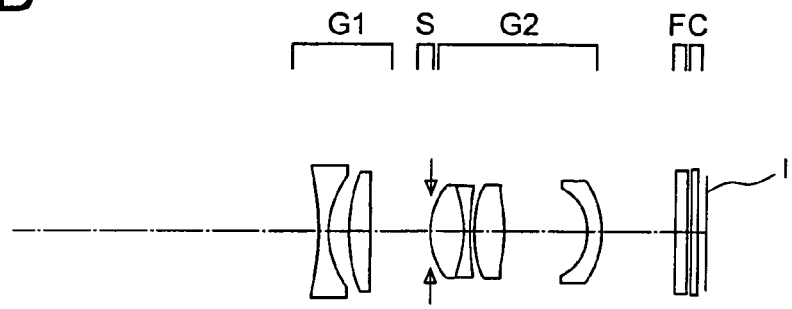
Figure 2C:
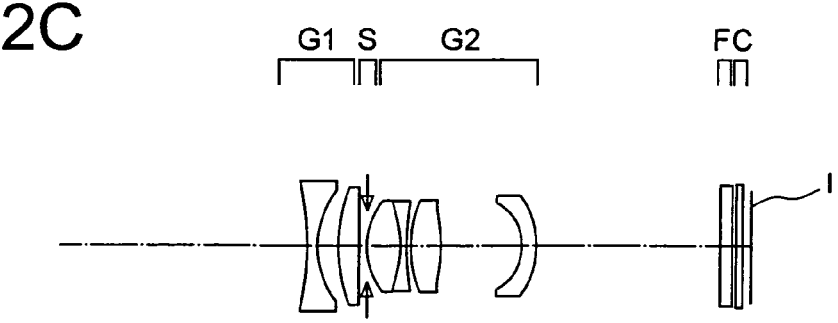

A zoom lens system in the second embodiment, as shown in FIG. 2A, FIG. 2B, and FIG. 2C, includes in order from the object side thereof, a first lens unit G1 having a negative refracting power, an aperture stop S, and a second lens unit G2 having a positive refracting power.

At the time of zooming from the wide angle end to the telephoto end, the first lens unit G1, after moving toward the image side, moves toward the object side. The second lens unit G2 moves only toward the object side. The focusing is carried out by a movement of the rear sub-unit, and an operation of focusing from a long distance object point to a short distance object point is carried out by moving the rear sub-unit to the image side.

In order from the object side, the first lens unit G1 includes a biconcave negative lens and a biconvex positive lens. The second lens unit G2 includes a cemented lens of a biconvex positive lens and biconcave negative lens, a biconvex positive lens (front sub-unit having a positive refracting power), and a negative meniscus lens having a convex surface directed toward the object side (rear lens unit having a negative refracting power).

An aspheric surface is used for three surfaces namely, a surface on the image side of the biconcave negative lens in the first lens unit G1, a surface on the object side of the biconvex positive lens on the object side, and a surface on the image side of the biconvex positive lens on the image side in the second lens unit G2.

Figure 3A:
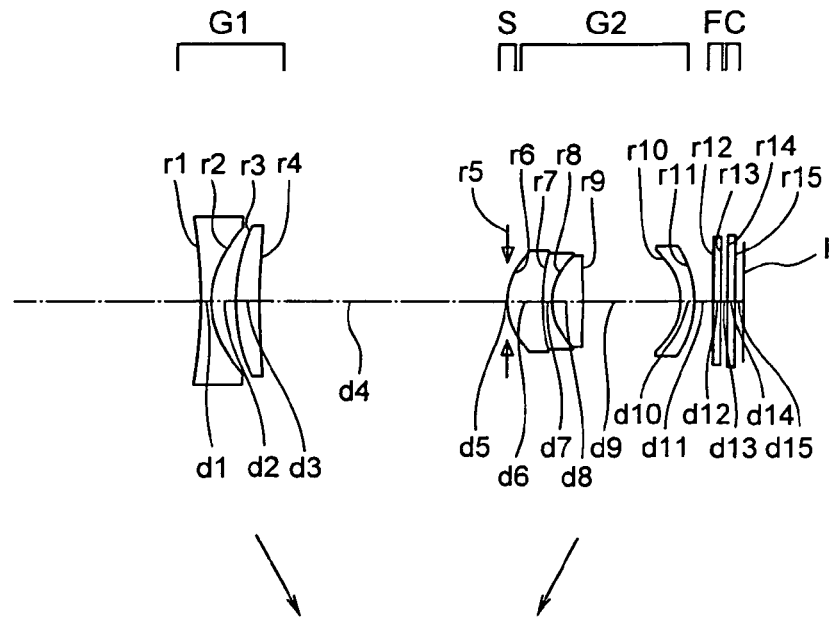
FIG. 3A, FIG. 3B, and FIG. 3C are diagrams similar to FIG. 1A, FIG. 1B, and FIG. 1C respectively, of a third embodiment of the zoom lens system of the present invention.
Figure 3B:
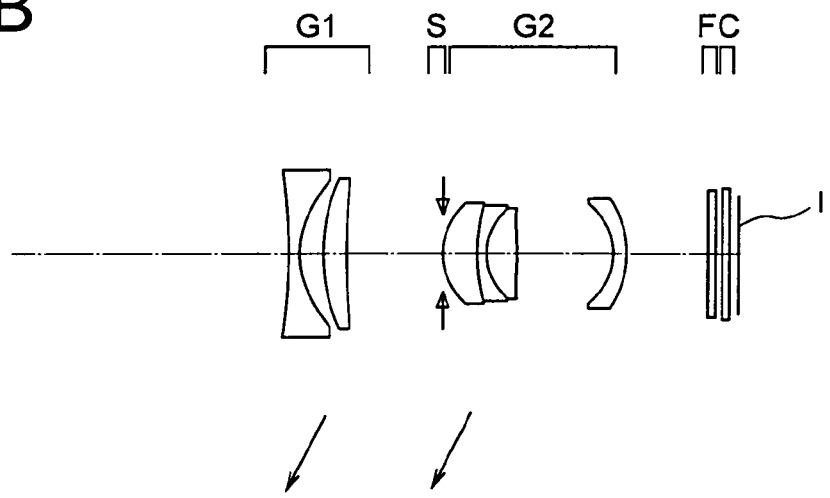
Figure 3C:
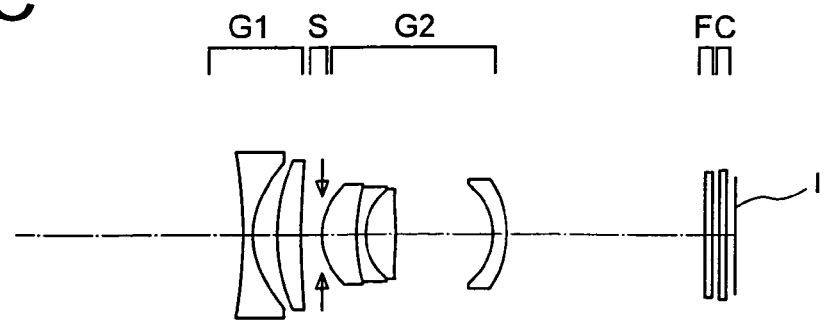

A zoom lens system in the third embodiment, as shown in FIG. 3A, FIG. 3B, and FIG. 3C, includes in order from the object side thereof, a first lens unit G1 having a negative refracting power, an aperture stop S, and a second lens unit G2 having a positive refracting power.

At the time of zooming from the wide angle end to the telephoto end, the first lens unit G1, after moving toward the image side, moves toward the object side. The second lens unit G2 moves only toward the object side. The focusing is carried out by a movement of the rear sub-unit, and an operation of focusing from a long distance object point to a short distance object point is carried out by moving the rear sub-unit to the image side.

In order from the object side, the first lens unit G1 includes a biconcave negative lens and a positive meniscus lens having a convex surface directed toward the object side. The second lens unit G2 includes a cemented lens (front sub-unit having a positive refracting power) of a positive meniscus lens having a convex surface directed toward the object side, a negative meniscus lens having a convex surface directed toward the object side, and a biconvex positive lens, and a negative meniscus lens having a convex surface directed toward the image side (rear sub-unit having a negative refracting power).

A aspheric surface is used for five surfaces namely, both surfaces of the biconcave negative lens in the first lens unit, a surface on the object side of the positive meniscus lens, a surface on the image side of the biconvex positive lens, and a surface on the object side of the negative meniscus lens having the convex surface directed toward the image side.

Numerical data of each embodiment described above is shown below. Apart from symbols described above, f denotes a focal length of the entire zoom lens system, $F_{NO}$ denotes an F number, ω denotes a half image angle, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number of each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, $A_4$, $A_6$, $A_8$, $A_{10}$, and $A_{12}$ denote aspherical surface coefficients of a fourth order, a sixth order, an eight order, a tenth order, and a twelfth order respectively.

Moreover, in the aspherical surface coefficients, 'e-n' (where, n is an integral number) indicates '$10^{-n}$'.

Example 1
unit mm

Surface data

| Surface No | r | d | nd | vd |
|---|---|---|---|---|
| 1* | −109.133 | 0.70 | 1.88300 | 40.76 |
| 2* | 6.005 | 1.73 | | |
| 3 | 11.191 | 1.71 | 1.84666 | 23.78 |
| 4 | 54.513 | Variable | | |
| 5(S) | ∞ | 0.00 | | |
| 6* | 4.493 | 2.40 | 1.51633 | 64.14 |
| 7 | 9.235 | 0.50 | 1.90366 | 31.32 |
| 8 | 3.829 | 2.15 | 1.62263 | 58.16 |
| 9* | −25.819 | 6.73 | | |
| 10* | −3.830 | 1.00 | 1.49700 | 81.54 |
| 11 | −6.033 | Variable | | |
| 12 | ∞ | 0.50 | 1.53996 | 59.45 |
| 13 | ∞ | 0.50 | | |
| 14 | ∞ | 0.49 | 1.51633 | 64.14 |
| 15 | ∞ | 0.58 | | |
| Image plane | | (Light receiving surface) | | |

Aspherical coefficients

1st surface

K = 0.000, A4 = −5.77590e−04, A6 = 3.18741e−05, A8 = −8.21251e−07, A10 = 7.76919e−09

2nd surface

K = 0.000, A4 = −1.05824e−03, A6 = 2.36637e−05, A8 = −4.72993e−07, A10 = −1.59450e−08

6th surface

K = −0.289, A4 = −1.34320e−04, A6 = −1.32741e−05, A8 = 1.38640e−06

9th surface

K = 18.466, A4 = 1.02416e−03, A6 = 5.55050e−06, A8 = 1.49025e−06, A10 = 5.87865e−07

10th surface

K = −0.460, A4 = −7.45600e−04, A6 = −5.41084e−05, A8 = −1.49108e−07, A10 = −2.26247e−07

Unit focal length

| f1 = −12.52 | f2 = 9.55 |
|---|---|

Zoom data

| | WE | ST | TE |
|---|---|---|---|
| IH | 3.84 | 3.84 | 3.84 |
| focal length | 5.80 | 11.50 | 22.20 |
| Fno. | 2.86 | 3.94 | 6.00 |
| 2ω(°) | 76.65 | 37.69 | 19.68 |
| BF | 3.02 | 7.37 | 15.54 |
| Total length | 36.66 | 30.80 | 33.95 |
| d4 | 16.73 | 6.51 | 1.50 |
| d11 | 1.30 | 5.65 | 13.82 |

Example 2
unit mm

Surface data

| Surface No | r | d | nd | vd |
|---|---|---|---|---|
| 1 | −23.483 | 0.70 | 1.88300 | 40.76 |
| 2* | 6.256 | 1.46 | | |
| 3 | 12.278 | 1.52 | 1.84666 | 23.78 |
| 4 | −353.569 | Variable | | |
| 5(S) | ∞ | 0.00 | | |

-continued

| | | | | |
|---|---|---|---|---|
| 6* | 5.791 | 2.40 | 1.61772 | 49.81 |
| 7 | −10.057 | 0.50 | 2.00069 | 25.46 |
| 8 | 29.274 | 0.25 | | |
| 9 | 8.540 | 2.15 | 1.51742 | 52.43 |
| 10* | −12.235 | 5.99 | | |
| 11 | −3.567 | 1.00 | 1.61800 | 63.33 |
| 12 | −6.673 | Variable | | |
| 13 | ∞ | 0.84 | 1.53996 | 59.45 |
| 14 | ∞ | 0.26 | | |
| 15 | ∞ | 0.49 | 1.51633 | 64.14 |
| 16 | ∞ | 0.58 | | |
| Image plane | | (Light receiving surface) | | |

Aspherical coefficients

2nd surface

K = 0.000, A4 = −6.81162e−04, A6 = 2.01536e−05, A8 = −2.08991e−06, A10 = 4.58655e−08
6th surface K = −0.456, A4 = −1.96453e−05, A6 = 1.96110e−05, A8 = 2.34309e−07
10th surface K = 0.000, A4 = 1.06482e−03, A6 = 3.13255e−05, A8 = −2.41829e−06, A10 = 2.00493e−07

Unit focal length

| f1 = −11.19 | f2 = 8.20 |
|---|---|

Zoom data

| | WE | ST | TE |
|---|---|---|---|
| IH | 3.84 | 3.84 | 3.84 |
| focal length | 5.80 | 11.50 | 22.20 |
| Fno. | 2.71 | 3.85 | 6.00 |
| 2ω(°) | 76.82 | 37.56 | 19.64 |
| BF | 3.00 | 7.18 | 15.02 |
| Total length | 31.14 | 27.47 | 31.47 |
| d4 | 12.17 | 4.33 | 0.49 |
| d12 | 1.30 | 5.48 | 13.31 |

Example 3
unit mm

Surface data

| Surface No | r | d | nd | vd |
|---|---|---|---|---|
| 1* | −64.383 | 0.70 | 1.88300 | 40.76 |
| 2* | 5.890 | 1.56 | | |
| 3 | 11.638 | 1.65 | 2.00069 | 25.46 |
| 4 | 57.232 | Variable | | |
| 5(S) | ∞ | 0.00 | | |
| 6* | 4.463 | 2.40 | 1.51633 | 64.14 |
| 7 | 11.223 | 0.67 | 1.90366 | 31.32 |
| 8 | 4.087 | 2.15 | 1.62263 | 58.16 |
| 9* | −24.552 | 6.58 | | |
| 10* | −4.325 | 1.00 | 1.49700 | 81.54 |
| 11 | −7.022 | Variable | | |
| 12 | ∞ | 0.50 | 1.53996 | 59.45 |
| 13 | ∞ | 0.50 | | |
| 14 | ∞ | 0.49 | 1.51633 | 64.14 |
| 15 | ∞ | 0.58 | | |
| Image plane | | (Light receiving surface) | | |

Aspherical coefficients

1st surface

K = 0.000, A4 = −5.86177e−04, A6 = 3.49915e−05, A8 = −8.92496e−07, A10 = 7.70146e−09
2nd surface K = 0.000, A4 = −1.16730e−03, A6 = 2.84379e−05, A8 = −5.33001e−07, A10 = −2.27002e−08

-continued

6th surface

K = −0.283, A4 = −1.35309e−04, A6 = −1.18513e−05, A8 = 1.57049e−06
9th surface

K = 4.195, A4 = 1.17101e−03, A6 = 1.48471e−05, A8 = 2.11731e−06, A10 = 8.03233e−07
10th surface K = −0.255, A4 = −2.66110e−04, A6 = −2.67356e−05, A8 = −7.26593e−07, A10 = −1.73717e−08

Unit focal length

| f1 = −12.70 | f2 = 9.53 |
|---|---|

Zoom data

| | WE | ST | TE |
|---|---|---|---|
| IH | 3.84 | 3.84 | 3.84 |
| focal length | 5.80 | 11.50 | 22.20 |
| Fno. | 2.87 | 3.95 | 6.00 |
| 2ω(°) | 76.48 | 37.65 | 19.67 |
| BF | 3.03 | 7.31 | 15.34 |
| Total length | 36.66 | 30.59 | 33.55 |
| d4 | 16.92 | 6.58 | 1.50 |
| d11 | 1.30 | 5.58 | 13.61 |

In embodiments from a fourth embodiment to a sixth embodiment, the zoom lens systems in the embodiments from the first embodiment to the third embodiment respectively are used. The embodiments from the fourth embodiment to the sixth embodiment are examples in which, an image pickup apparatus which corrects the distortion electrically is used, and a shape of the effective image pickup area changes at the time of zooming. Therefore, these embodiments differ from embodiments in which the image height and the image angle in a zoom state correspond.

The image pickup apparatus is an apparatus which includes a zoom lens system having a half image angle ω of 35° and more at the wide angle end.

In the embodiments from the fourth embodiment to the sixth embodiment, an image is recorded and displayed upon correcting electrically a barrel distortion at the wide angle side.

In the zoom lens system of these embodiments, a barrel distortion occurs at the wide angle end, on a rectangular photoelectric conversion surface. Whereas, an occurrence of distortion at the telephoto end and near the intermediate focal length state is suppressed. For correcting the distortion electrically, the effective image pickup area is let to be barrel shaped at the wide angle end, and rectangular shaped at the intermediate focal length state and at the telephoto end. Moreover, the effective image pickup area which is set in advance is subjected to image conversion by an image processing, and is converted to rectangular image information in which, the distortion is reduced.

An arrangement is made such that, the maximum image height $IH_w$ at the wide angle end becomes smaller than the maximum image height $IH_s$ at the intermediate focal length state, and the image height $IH_t$ at the telephoto end.

In the embodiments from the fourth embodiment to the sixth embodiment, an arrangement is made such that, at the wide angle end, a length in a direction of a short side of the photoelectric conversion surface is same as a length in a direction of a short side of the effective image pickup area, and the effective image pickup area is set to be such that, about −3% of distortion remains after the image processing. As a matter of course, an arrangement may be made such that, an image in which, a barrel shaped area smaller than this is converted to a rectangular shape as the effective image pickup area, is let to be an image which is recorded and reproduced.

A zoom lens system of the fourth embodiment has a structure similar to a structure of the zoom lens system in the first embodiment.

A zoom lens system of the fifth embodiment has a structure similar to a structure of the zoom lens system of the second embodiment.

A zoom lens system of the sixth embodiment has a structure similar to a structure of the zoom lens system of the third embodiment.

Data of the image height and full-image angle in the fourth embodiment is shown below.

| Zoom data | | | |
|---|---|---|---|
| | WE | ST | TE |
| focal length | 5.80 | 11.50 | 22.20 |
| Fno. | 2.86 | 3.94 | 6.00 |
| $2\omega(°)$ | 70.88 | 37.69 | 19.68 |
| IH | 3.56 | 3.84 | 3.84 |

Data of the image height and full-image angle in the fifth embodiment is shown below.

| Zoom data | | | |
|---|---|---|---|
| | WE | ST | TE |
| focal length | 5.80 | 11.50 | 22.20 |
| Fno. | 2.71 | 3.85 | 6.00 |
| $2\omega(°)$ | 70.69 | 37.56 | 19.64 |
| IH | 3.55 | 3.84 | 3.84 |

Data of the image height and full-image angle in the sixth embodiment is shown below.

| Zoom data | | | |
|---|---|---|---|
| | WE | ST | TE |
| focal length | 5.80 | 11.50 | 22.20 |
| Fno. | 2.87 | 3.95 | 6.00 |
| $2\omega(°)$ | 70.89 | 37.65 | 19.67 |
| IH | 3.57 | 3.84 | 3.84 |

Figure 4A:
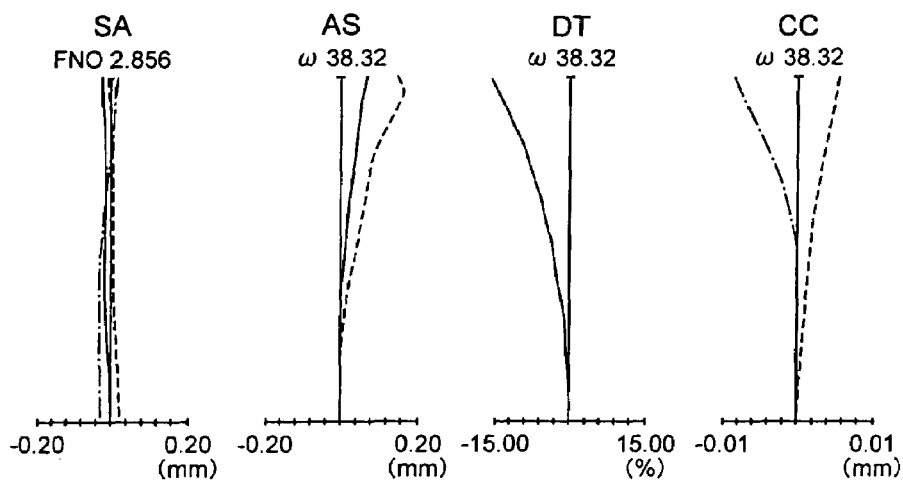
FIG. 4A, FIG. 4B, and FIG. 4C are aberration diagrams at the time of infinite object point focusing according to the first embodiment.
Figure 4B:
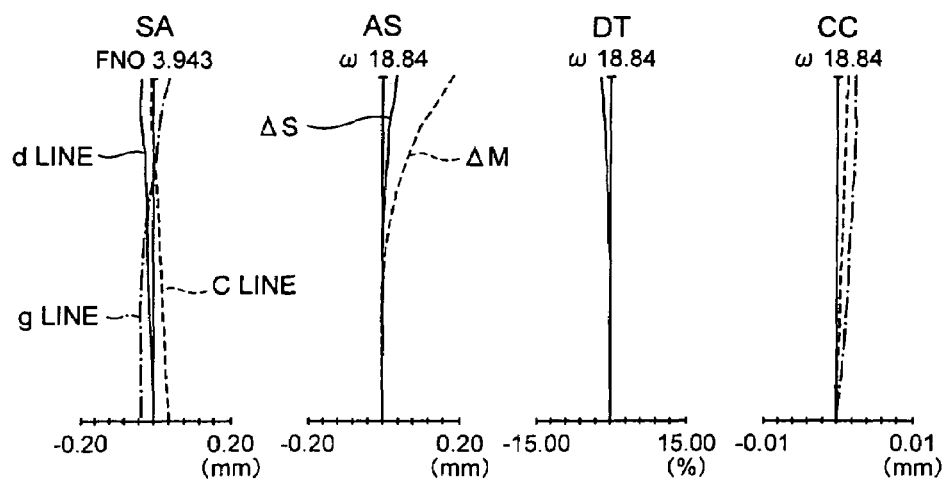
Figure 4C:
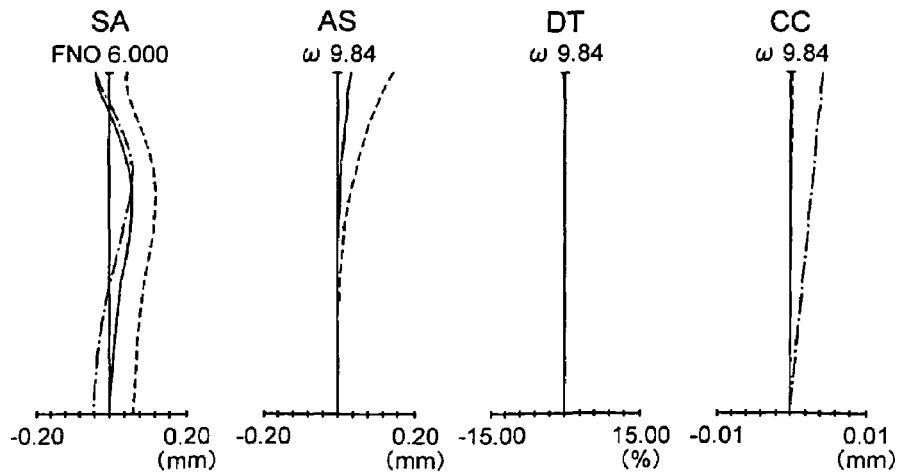
Figure 5A:
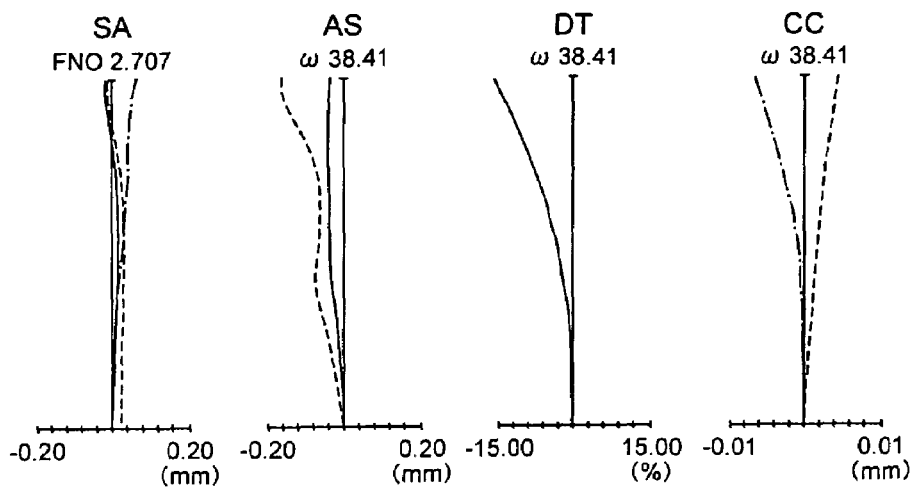
FIG. 5A, FIG. 5B, and FIG. 5C are aberration diagrams at the time of infinite object point focusing according to the second embodiment.
Figure 5B:
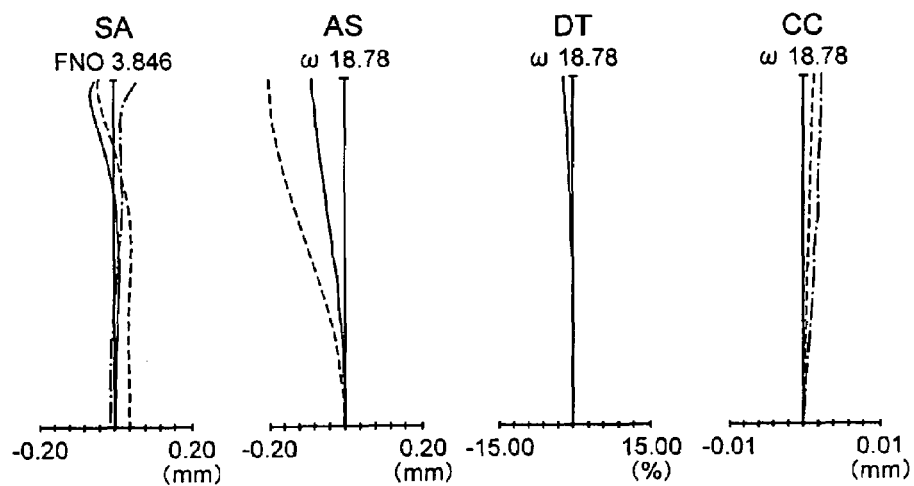
Figure 5C:
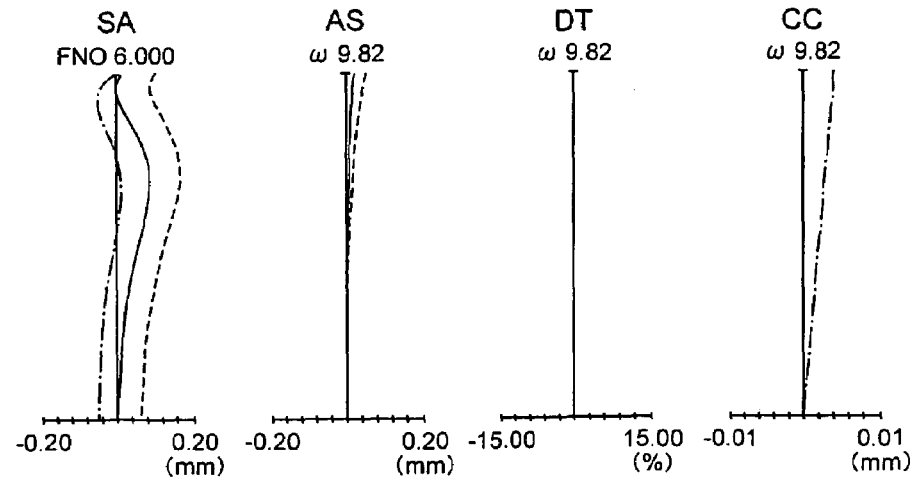
Figure 6A:
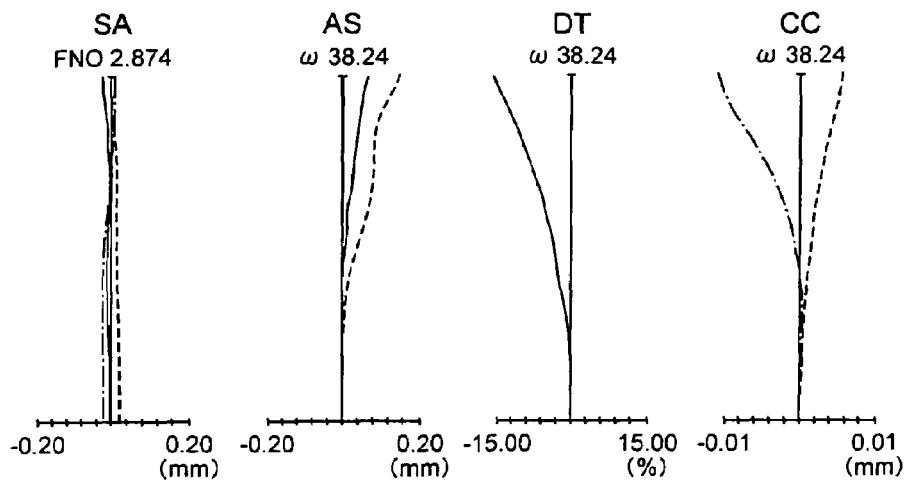
FIG. 6A, FIG. 6B, and FIG. 6C are aberration diagrams at the time of infinite object point focusing according to the third embodiment.
Figure 6B:
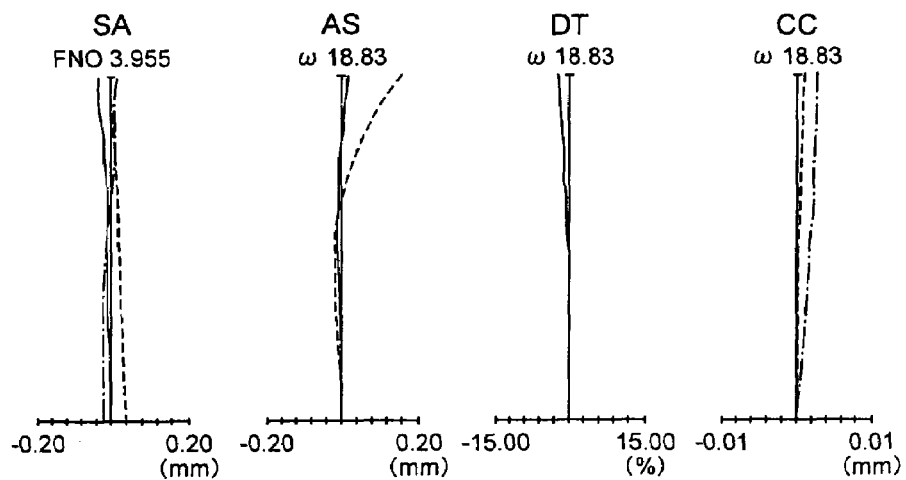
Figure 6C:
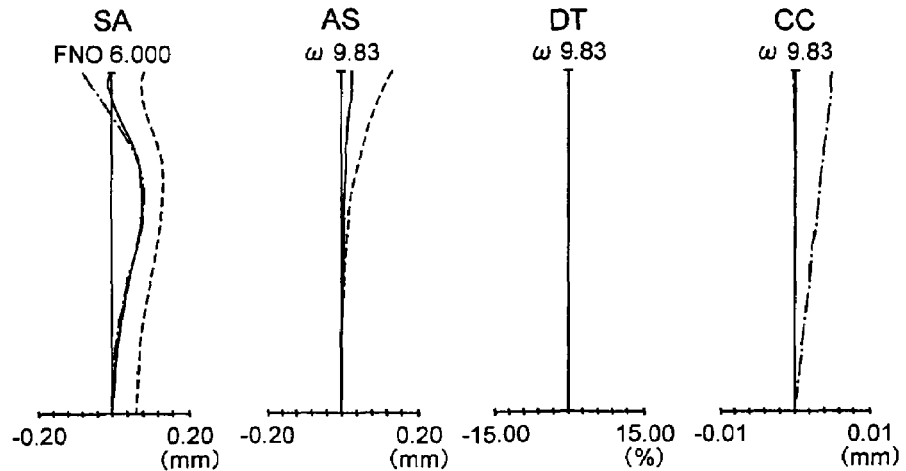

Aberration diagrams at the time of infinite object point focusing of the embodiments from the first embodiment to the third embodiment are shown in FIG. 4A to FIG. 6C. In these aberration diagrams, FIG. 4A, FIG. 5A and FIG. 6A show a spherical aberration (SA), an astigmatism (AS), a distortion (DT), and a chromatic aberration of magnification (CC) respectively, at the wide angle end, FIG. 4B, FIG. 5B and FIG. 6B show a spherical aberration, an astigmatism, a distortion, and a chromatic aberration of magnification respectively, at the intermediate focal length state, and FIG. 4C, FIG. 5C and FIG. 6C show a spherical aberration, an astigmatism, a distortion, and a chromatic aberration of magnification at the telephoto end. In each diagram, 'ω' shows a half image angle.

Data of the conditional expressions (1) to (6) according to each of embodiments are shown below.

| | Example 1 | Example 2 | Example 3 |
|---|---|---|---|
| (1) $f_t/f_w$ | 3.83 | 3.83 | 3.83 |
| (2) $d_{2FR}/f_w$ | 1.16 | 1.03 | 1.13 |
| (3) $D_w/f_w$ | 6.38 | 5.45 | 6.38 |
| (4) $D_t/f_t$ | 1.54 | 1.44 | 1.53 |
| (5) $(r_{L11} + r_{L12})/(r_{L11} - r_{L12})$ | 0.90 | 0.58 | 0.83 |
| (6) EX (w) | −18.27 | −20.92 | −18.46 |

| | Example 4 | Example 5 | Example 6 |
|---|---|---|---|
| (1) $f_t/f_w$ | 3.83 | 3.83 | 3.83 |
| (2) $d_{2FR}/f_w$ | 1.16 | 1.03 | 1.13 |
| (3) $D_w/f_w$ | 6.38 | 5.45 | 6.38 |
| (4) $D_t/f_t$ | 1.54 | 1.44 | 1.53 |
| (5) $(r_{L11} + r_{L12})/(r_{L11} - r_{L12})$ | 0.90 | 0.58 | 0.83 |
| (6) EX(w) | −17.04 | −19.46 | −17.23 |

Incidentally, for preventing the occurrence of the ghost and the flare, generally, the antireflection coating is applied to a surface of a lens in contact with air.

On the other hand, at a cemented surface of a cemented lens, a refractive index of an adhesive is sufficiently higher than a refractive index of air. Therefore, in many cases, a reflectance is originally of the level of a single-layer coating, or lower, and the coating is applied in few cases. However, when the antireflection coating is applied positively even to the cemented surface, it is possible to reduce further the ghost and the flare, and to achieve a more favorable image.

Particularly, recently, a glass material having a high refractive index has been widely used in an optical system of cameras, for having a high effect on the aberration correction. However, when the glass material having a high refractive index is used as a cemented lens, a reflection at the cemented surface becomes unignorable. In such a case, applying the antireflection coating on the cemented surface is particularly effective.

An effective usage of the cemented surface coating has been disclosed in Japanese Patent Application Laid-open Publication No. Hei 2-27301, No. 2001-324676, No. 2005-92115, and U.S. Pat. No. 7,116,482. In these patent literatures, a cemented lens surface coating in a first lens unit of a positive preceding zoom lens system has been described, and the same as disclosed in these patent literatures may be implemented for the cemented lens surface in the first lens unit having a positive power, of the present invention.

As a coating material to be used, according to a refractive index of the adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, ZnO, and $Y_2O_3$ having a comparatively higher refractive index, and coating materials such as $MgF_2$, $SiO_2$, and $Al_2O_3$ having a comparatively lower refractive index may be selected appropriately, and set to a film thickness which satisfies phase conditions.

Naturally, similar to the coating on the surface of the lens in contact with air, the coating on the cemented surface may also be let to be a multi layer coating. By combining appropriately a film thickness and a coating material of number of films not less than in two layers, it is possible to reduce further the reflectance, and to control spectral characteristics and angular characteristics.

Moreover, it is needless to mention that for the cemented surface of lenses other than the lenses in the first lens unit, it is effective to apply the coating on the cemented surface based on a similar idea.

(Correction of Distortion)

Incidentally, when the zoom lens system of the present invention is used, a digital correction of distortion of an image is carried out electrically. A basic concept for the digital correction of the distortion of an image will be described below.

Figure 7:
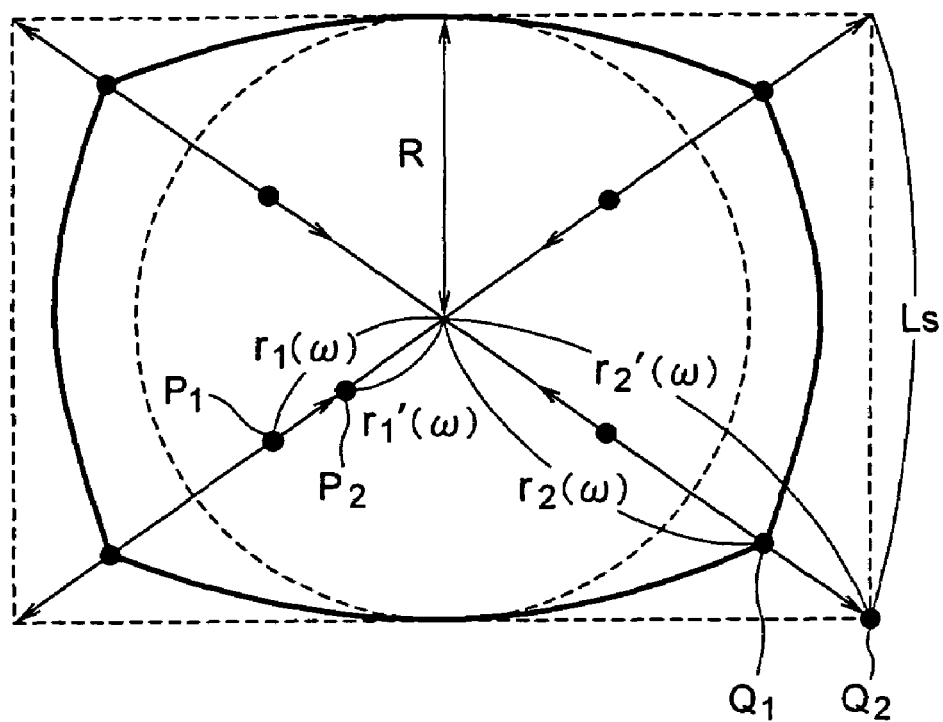
FIG. 7 is a diagram describing a correction of distortion.

For example, as shown in FIG. 7, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 7, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega) = \alpha \cdot f \tan \omega \quad (0 \leq \alpha \leq 1)$$

where, ω is a half image angle of an object and f is a focal length of an imaging optical system (the zoom lens system in the present invention).

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half image angle and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 \, Ls$$

where, Ls is a length of a short side of the effective image pickup surface.

It is preferable that the radius R satisfies the following conditional expression.

$$0.3 \, Ls \leq R \leq 0.6 \, Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $f=y/\tan \omega$ holds.

Here, y denotes a height (image height) of an image point from the optical axis, f denotes a focal length of an imaging system (zoom lens system in the present invention), and $\omega$ denotes an angle (object half image angle) with respect to the optical axis in an object point direction corresponding to image points connecting from a center on an image pickup plane up to a position of y.

When there is a barrel-shape distortion in the imaging system, the relationship becomes $f > y/\tan \omega$.

In other words, when the focal length f of the imaging system, and the image height y are let to be fixed, a value of $\omega$ becomes large.

(Digital Camera)

Figure 8:
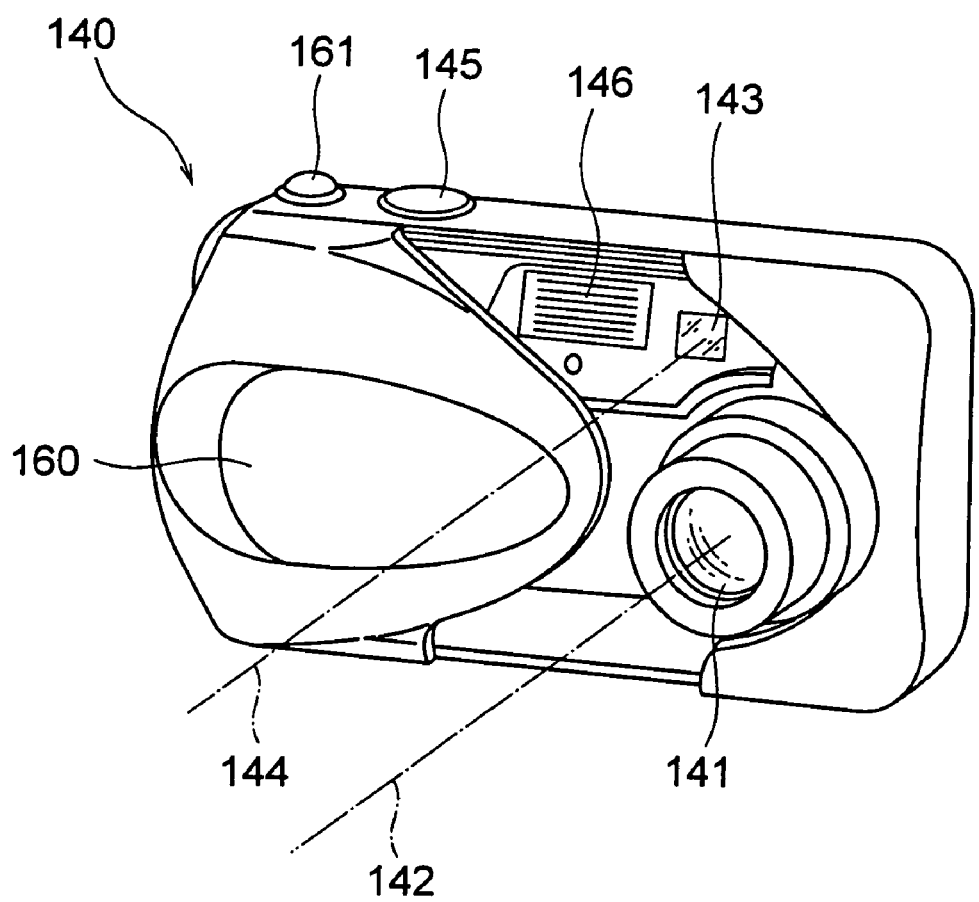
FIG. 8 is a front perspective view showing an appearance of a digital camera in which, a zoom lens system according to the present invention is incorporated.
Figure 9:
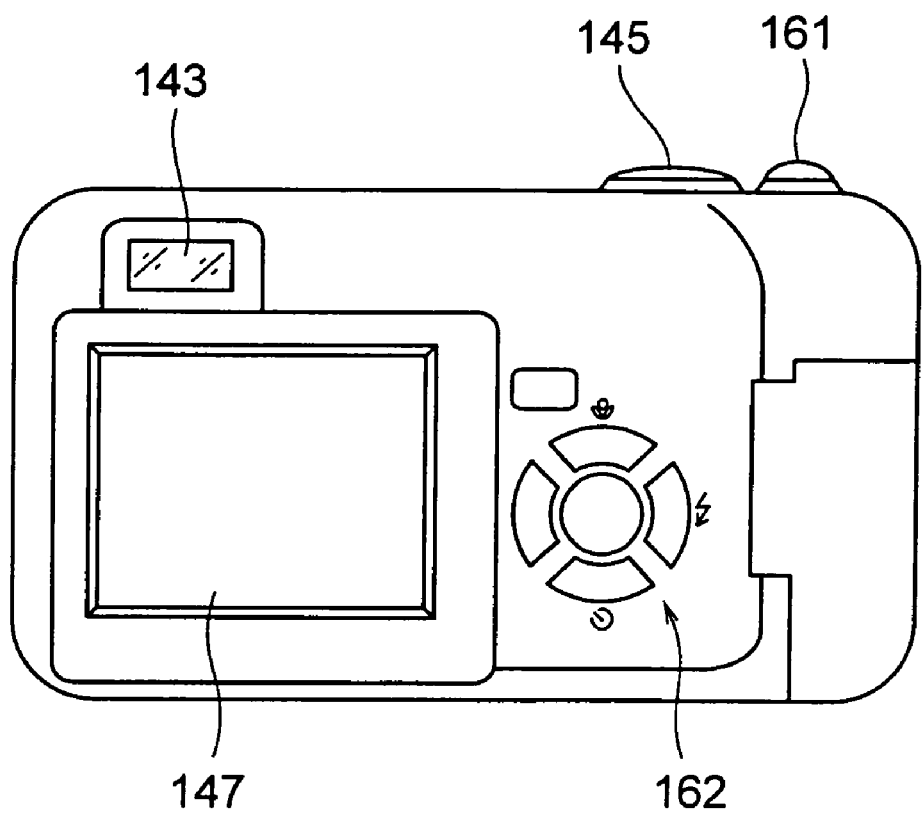
FIG. 9 is a rear perspective view of the digital camera in FIG. 8.
Figure 10:
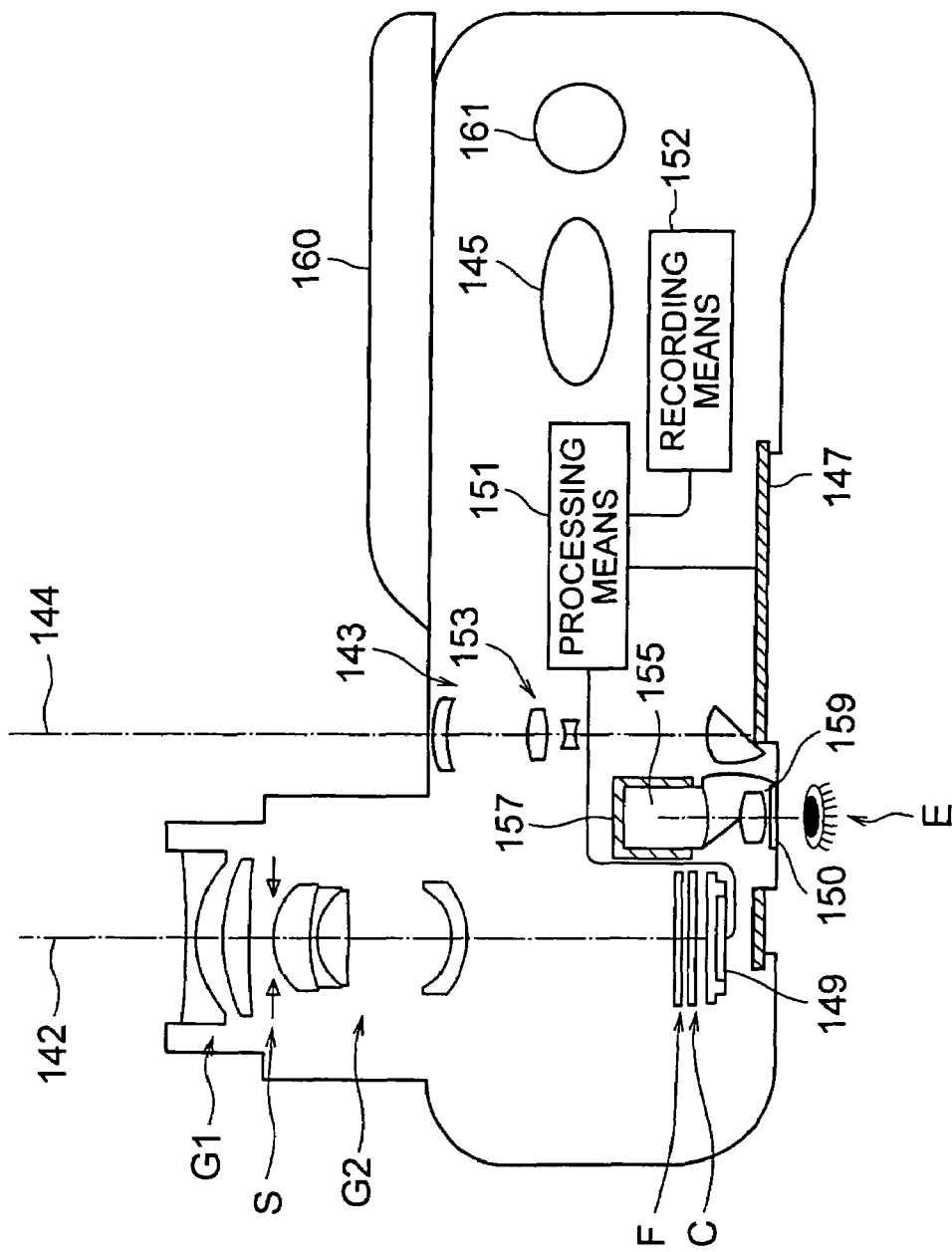
FIG. 10 is a cross-sectional view of the digital camera in FIG. 8.

FIG. 8 to FIG. 10 are conceptual diagrams of a structure of a digital camera according to the present invention in which a zoom lens system described above is incorporated in a taking optical system 141. FIG. 8 is a front perspective view showing an appearance of a digital camera 140, FIG. 9 is a rear perspective view of the same, and FIG. 10 is a schematic cross-sectional view showing a structure of the digital camera 140. In FIG. 8 and FIG. 10, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 8, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on afield frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle.

(Internal Circuit Structure)

Figure 11:
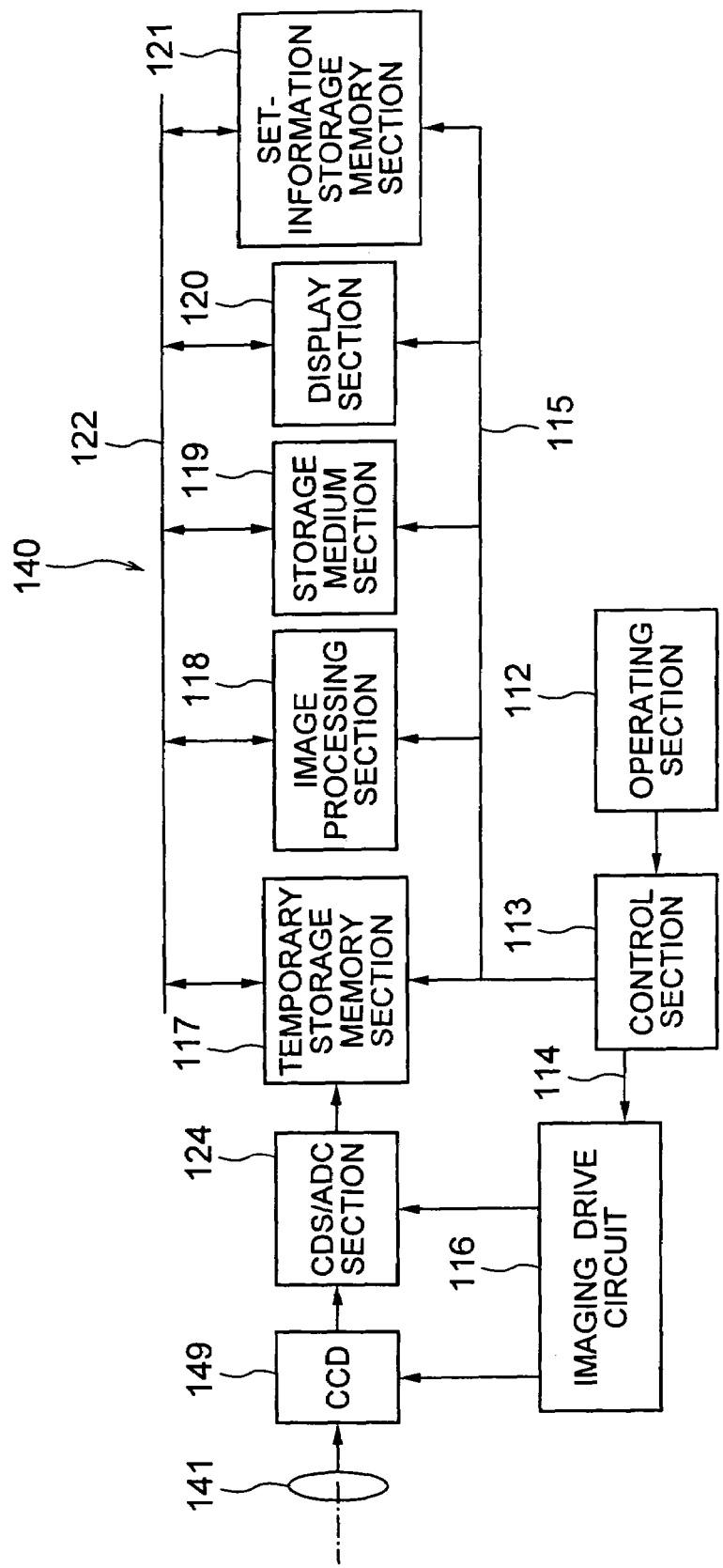
FIG. 11 is a structural block diagram of an internal circuit of main components of a digital camera.

FIG. 11 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 11, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light, for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

It is possible to provide a zoom lens system which is advantageous for securing the zooming ratio, and making the size small and light, and which can easily secure the optical performance, and an image pickup apparatus which includes such zoom lens system.

What is claimed is:

1. A two-unit zoom lens system comprising in order from an object side thereof:
    a first lens unit having a negative refracting power;
    a second lens unit having a positive refracting power; and
    an aperture stop which is disposed between the first lens unit and the second lens unit, and which moves integrally with the second lens unit, wherein
    at a time of zooming from a wide angle end to a telephoto end, a distance between the first lens unit and the second lens unit is narrowed, and
    at the time of zooming from the wide angle end to the telephoto end, the first lens unit, after moving toward an image side, moves toward an object side, and
    at the time of zooming from the wide angle end to the telephoto end, the second lens unit moves toward the object side, and
    the second lens unit comprises in order from the object side thereof, a front sub-unit having a positive refracting power and a rear sub-unit having a negative refracting power, with the longest air space in the second lens unit between the front sub-unit and the rear sub-unit, and there is no other lens unit in the second lens unit, and
    the two-unit zoom lens system satisfies the following conditional expressions $$f_t/f_w > 3.6 \quad (1)$$

$$0.5 < d_{2FR}/f_w < 1.5 \quad (2)$$

where,
$f_w$ denotes a focal length at the wide angle end, of the two-unit zoom lens system,
$f_t$ denotes a focal length at the telephoto end, of the two-unit zoom lens system, and
$d_{2FR}$ denotes an air space on an optical axis between the front sub-unit and the rear sub-unit in the second lens unit.

2. The two-unit zoom lens system according to claim 1, wherein a focusing from an object at a long distance to an object a short distance is carried out by moving the rear sub-unit in the second lens unit to the image side.

3. The two-unit zoom lens system according to claim 1, wherein the two-unit zoom lens system satisfies the following conditional expressions $$3 < D_w/f_w < 8 \quad (3)$$

$$0.3 < D_t/f_t < 1.8 \quad (4)$$

where,
$D_w$ denotes an overall optical axial length at the wide angle end, of the two-unit zoom lens system,
$D_t$ denotes an overall optical axial length at the telephoto end, of the two-unit zoom lens system, and
the overall length is a length which is obtained by adding a back focus expressed in terms of an air conversion length, to an optical axial thickness from a surface of incidence of a lens nearest to the object up to a surface of emergence of a lens nearest to the image, of the two-unit zoom lens system.

4. The two-unit zoom lens system according to claim 1, wherein the first lens unit comprises a negative lens which is disposed nearest to the object, and which satisfies the following conditional expression $$0.0 < (r_{L11} + r_{L12})/(r_{L11} - r_{L12}) < 3.0 \quad (5)$$

where,
$r_{L11}$ denotes a paraxial radius of curvature of a surface on the object side, of the negative lens nearest to the object, in the first lens unit, and
$r_{L12}$ denotes a paraxial radius of curvature of a surface on the image side, of the negative lens nearest to the object, in the first lens unit.

5. The two-unit zoom lens system according to claim 1, wherein
the front sub-unit in the second lens unit comprises a cemented lens component having a positive lens and a negative lens, and
an Abbe's number of the negative lens in the cemented lens component is smaller than an Abbe's number of the positive lens in the cemented lens component.

6. The two-unit zoom lens system according to claim 1, wherein the total number of lenses in the rear sub-unit in the second lens unit is one.

7. The two-unit zoom lens system according to claim 1, wherein a lens surface nearest to the object and a lens surface nearest to the image in the front sub-unit in the second lens unit are aspheric surfaces.

8. An image pickup apparatus comprising:
    a two-unit zoom lens system; and
    an image pickup element which is disposed at an image side of the two-unit zoom lens system, and which converts an optical image formed by the two-unit zoom lens system, to an electric signal, wherein the two-unit zoom lens system is a zoom lens system according to claim 1.

9. The image pickup apparatus according to claim 8, further comprising:

an image conversion section which converts the electric signal including a distortion due to the two-unit zoom lens system, to an image signal in which, the distortion is corrected by an image processing.

10. The image pickup apparatus according to claim 8, wherein in a state at the wide angle end of the two-unit zoom lens system, an angle formed between an optical axis and a chief ray which is emerged from the two-unit zoom lens system directed toward a maximum image height of an effective image pickup area of the image pickup element satisfies the following conditional expression $$-40° < EX(w) < -11° \quad (6)$$

where,

EX(w) denotes the angle formed between the optical axis and the chief ray which is emerged from the two-unit zoom lens system directed toward the maximum image height of the effective image pickup area of the image pickup element.

* * * * *